(12) United States Patent
Durham et al.

(10) Patent No.: US 9,592,906 B2
(45) Date of Patent: Mar. 14, 2017

(54) AIR CUSHIONED LANDING SYSTEM FOR AIR VEHICLES

(71) Applicant: Hybrid Air Vehicles Limited, Bedford (GB)

(72) Inventors: Michael Durham, Buckinghamshire (GB); Paul Macey, Somerset (GB)

(73) Assignee: Hybrid Air Vehicles Limited (GB)

(*) Notice: Subject to any disclaimer, the term of this patent is extended or adjusted under 35 U.S.C. 154(b) by 81 days.

(21) Appl. No.: 14/492,154

(22) Filed: Sep. 22, 2014

(65) Prior Publication Data
US 2015/0083856 A1    Mar. 26, 2015

(30) Foreign Application Priority Data
Sep. 23, 2013 (GB) .................... 1316864.6

(51) Int. Cl.
*B64C 25/00* (2006.01)
*B60V 1/16* (2006.01)
(Continued)

(52) U.S. Cl.
CPC ............ *B64C 25/001* (2013.01); *B60V 1/043* (2013.01); *B60V 1/06* (2013.01); *B60V 1/16* (2013.01); *B60V 3/08* (2013.01); *B64B 2201/00* (2013.01)

(58) Field of Classification Search
CPC ....... B64C 25/56; B64C 25/54; B64C 35/002; B64C 25/001; B64D 25/00; B60V 3/08; B60V 1/043; B60V 1/16; B60V 1/06
See application file for complete search history.

(56) References Cited

U.S. PATENT DOCUMENTS 1,844,765 A    2/1932  Jackson
3,260,323 A *  7/1966  Henry ...................... B60V 1/16
                                                         180/128
(Continued)

FOREIGN PATENT DOCUMENTS

EP    2143610    1/2010
EP    2230173    9/2010
(Continued)

OTHER PUBLICATIONS

Dictionary.com, Adjacent definition, http://www.dictionary.com/browse/adjacent, accessed Apr. 15, 2016.*
(Continued)

*Primary Examiner* — Timothy D Collins
(74) *Attorney, Agent, or Firm* — Clement A. Berard, Esq.; Dann, Dorfman, Herrell & Skillman, PC

(57) ABSTRACT

An air cushioned landing system for an air vehicle comprises an inflatable and deflatable skirt (113) in the form of a tube having inner (101) and outer (100) walls. The inner wall defines a central plenum (116) within the skirt, the skirt including gas pockets (130) arranged to stiffen one or more regions of at least one of the inner (101) and outer (100) sidewalls during deflation of the skirt. A gas pocket fan inflates the gas pockets prior to and during deflation of the skirt, wherein the gas pockets are constrained to move from a mutually spaced apart position when the skirt is inflated, to a mutually closely adjacent position when the skirt is fully deflated.

18 Claims, 2 Drawing Sheets

(51) Int. Cl.
  *B60V 3/08*  (2006.01)
  *B60V 1/04*  (2006.01)
  *B60V 1/06*  (2006.01)

(56) References Cited

U.S. PATENT DOCUMENTS

| | | | | |
|---|---|---|---|---|
| 3,268,021 A | * | 8/1966 | Jones | B60V 1/16 180/128 |
| 3,275,270 A | * | 9/1966 | Earl | B60V 1/16 180/116 |
| 3,297,280 A | | 1/1967 | Lee | |
| 3,302,738 A | * | 2/1967 | Bingham | B60V 1/043 180/128 |
| 3,438,457 A | * | 4/1969 | Faure | B60V 1/043 180/121 |
| 3,524,517 A | | 8/1970 | La Fleur | |
| 3,643,757 A | * | 2/1972 | Delamare | B60V 1/16 180/127 |
| 3,700,065 A | * | 10/1972 | Eggington | B60V 1/16 180/121 |
| 3,802,602 A | | 4/1974 | Wilson | |
| 3,826,330 A | | 7/1974 | Armstrong | |
| 3,827,527 A | * | 8/1974 | Bertelsen | B60V 1/043 180/120 |
| 4,019,698 A | * | 4/1977 | Earl | B60V 3/08 180/119 |
| 4,077,589 A | * | 3/1978 | Belolipetsky | B60V 3/08 180/119 |
| 4,100,989 A | * | 7/1978 | Barbot | B60V 3/06 180/126 |
| 4,923,145 A | * | 5/1990 | Broadhurst | B60V 3/08 244/100 A |
| 2003/0001044 A1 | | 1/2003 | Munk | |
| 2009/0314880 A1 | | 12/2009 | Rawdon | |
| 2010/0001128 A1 | * | 1/2010 | Morehead | B60V 3/08 244/100 A |
| 2010/0140388 A1 | * | 6/2010 | London | B60V 3/08 244/5 |

FOREIGN PATENT DOCUMENTS

| | | |
|---|---|---|
| GB | 2445744 | 7/2008 |
| WO | 0194172 | 12/2001 |
| WO | 03/047967 | 6/2003 |

OTHER PUBLICATIONS

UK Intellectual Property Office, "Search Report—Application No. GB 1316864.6", Mar. 27, 2014, 1 page.

European Patent Office, "European Search Report—Application No. EP 14185541", Feb. 17, 2015, 1 page.

\* cited by examiner

AIR CUSHIONED LANDING SYSTEM FOR AIR VEHICLES

This Application claims the benefit of the priority of United Kingdom Patent Application No. 1316864.6 entitled "LANDING SYSTEMS FOR AIR VEHICLES" which was filed on Sep. 23, 2013, and is hereby incorporated herein its entirety by reference.

BACKGROUND TO THE INVENTION

This invention relates to air cushioned landing systems for air vehicles, such as hybrid air vehicles.

The invention is particularly, but not exclusively, involved with the ground handling of hybrid air vehicles over rough or unprepared ground or water.

Hybrid air vehicles, as described in WO 2001/094172, are a form of airship that provide fuel efficient, long endurance freight transport/ISR capability through a combination of aerostatic lift, aerodynamic lift, and vectored thrust. Hybrid air vehicles tend to have bi-lobe or tri-lobe hulls extending longitudinally. This not only improves aerodynamic characteristics over traditional airships (single cigar-shaped hull) but also allows a wider base for improved ground handling.

The combination of aerodynamic lift and vectored thrust allows the vehicle to operate heavier-than-equilibrium, i.e. they are able to sit on the ground and use vectored thrust and aerodynamic lift to take-off. Vectored thrust also allows the vehicle to sit on the ground whilst lighter-than-equilibrium, i.e. the engine thrust pushes the vehicle on to the ground before ballast or payload is added to make the vehicle heavier-than-equilibrium.

Traditional airships require large numbers of ground crew to capture and launch the vehicle. They tend to be moored to a mast at roughly equilibrium with landing gear attached to the underside of the gondola and/or hull to absorb any movement.

Hybrid air vehicles can potentially dispense with large numbers of ground crew as they are able to land and take-off like conventional aircraft. Conventional aircraft landing gear could be used but this would limit the vehicle to operating from prepared sites.

Accordingly, a number of proposals have been made to provide airships and hybrid air vehicles with an Air Cushioned Landing System (ACLS). In particular, bag skirts have been proposed, for example formed toroidally, inflated with air and defining a central plenum in which air can be pressurised for use when landing or taxiing, or from which air can be evacuated to create suction to the ground when the air vehicle is lighter-than-equilibrium.

In some cases, the bag skirt can be deflated and is retractable during flight for better aerodynamics and possibly an improved field of vision for vehicle occupants and/or payload sensors. For example, WO 03/047967 describes bladder means attached to elongate bag skirts, retraction being effected by "zipping up" the bladder means. US 2012/0043416 A1 proposes bag skirt covers that unroll from extensible shafts to assist in retraction of the bag skirts.

The known retraction mechanisms are unreliable. They involve external moving parts, which may be elasticated or sprung, and are susceptible to jamming, snagging of ground debris, ice accumulation, etc.

SUMMARY OF THE INVENTION

Accordingly, a first aspect of the present invention provides an air cushioned landing system for an air vehicle, comprising an inflatable and deflatable skirt in the form of a tube having inner and outer walls, the inner wall defining a central plenum within the skirt, the skirt including gas pockets arranged to stiffen one or more regions of at least one of the inner and outer walls during deflation of the skirt. Such stiffening is used to control the location of the deflated skirt. In a particular embodiment, the system comprises a fan for sucking gas out of the skirt to deflate it, and for moving the gas pockets to a retracted location to reduce the profile of the skirt in a controlled manner, for example causing the deflated skirt to occupy a space immediately below an air vehicle hull, essentially equal in height to a diameter or height of the gas pockets. The gas pockets may be constrained to move from a mutually spaced (e.g. equi-spaced) position, when the skirt is inflated, to a mutually adjacent position when the skirt is deflated.

In one embodiment, the inner and outer walls each have a plurality of said gas pockets. The tube of the inflatable skirt may be endless and generally circular or elliptical. If so, each gas pocket can comprise a further endless tube, generally concentric with the skirt. Alternatively or additionally, the gas pockets can form a lattice or an array.

The system may include a gas pocket fan for inflating the gas pockets prior to deflation of the skirt. Said gas pocket fan, or a further gas pocket fan, may be arranged to deflate the gas pockets to reduce the profile of the deflated or inflated skirt.

A second aspect of the invention provides an air cushioned landing system for an air vehicle, comprising an inflatable and deflatable skirt in the form of a tube having inner and outer walls, the inner wall defining a central plenum within the skirt, and a valve for placing the interior of the skirt in communication with the plenum and for isolating it therefrom. Control means may be provided for opening the valve prior to a landing event, to increase the compressibility of the skirt, and/or during hover borne operation, for equalising the pressures in the skirt and the plenum.

The valve may be located in a duct extending through an air vehicle hull from the skirt to the plenum.

A third aspect of the invention provides an air cushioned landing system for an air vehicle, comprising an inflatable and deflatable skirt in the form of a tube having inner and outer walls, the inner wall defining a central plenum within the skirt, and a flexible divider forming a connection between first and second peripherally spaced points on the inner wall. Such a divider can absorb circumferential tension in the skirt.

The divider may be formed as a cross-dam essentially equal in height to the skirt. The divider may comprise an inflatable and deflatable divider tube, which may have a V-shaped cross-section and may include gas pockets arranged to stiffen one or more regions of the divider tube during deflation thereof.

The skirt may comprise two or more part-circular lobes, which intersect where the divider meets the skirt.

The invention also provides an air vehicle having a gas-filled hull of flexible sheet material, wherein an air cushioned landing system as defined above is attached to an underside of the hull.

BRIEF DESCRIPTION OF THE DRAWINGS

Embodiments of the invention will now be described in more detail, by way of example only, with reference to the accompanying drawings, in which.

DETAILED DESCRIPTION OF PARTICULAR EMBODIMENTS

According to the invention, a plurality of hoverpads is attached in a conformal fashion to the underside of the airship or hybrid air vehicle's hull. Each hoverpad comprises one or more cells bounded around their periphery by an air inflated skirt, constructed from a flexible pressure resistant material.

Figure 1:
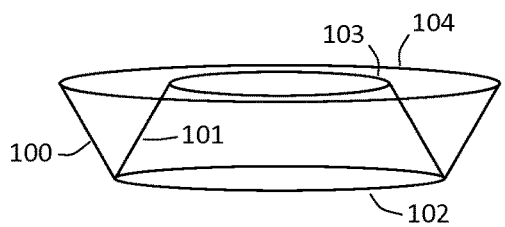
FIG. 1 is a schematic perspective view of the skirt of an air cushioned landing system according to the invention.

FIG. 1 shows a circular hoverpad skirt, made up of an outer conical sidewall 100 and an inner conical sidewall 101, joined along their bottom edge 102 to form a V-shaped cross-section. The top edges of the skirt sidewalls 103, 104 are joined in a conformal fashion to the air vehicle's hull.

In this example, local reinforcement or replaceable abrasion-resistant materials (not shown) are attached to the lower edges of the skirt operating in close proximity to or in contact with the ground. A series of secondary inflatable bags may be installed inside the skirt for emergency deployment in the event that the ACLS incurs critical puncture or tear damage, or to facilitate routine maintenance activities on the skirt sidewalls when they are in a partially deflated state.

Figure 2:
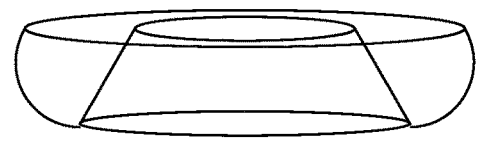
FIGS. 2, 3 and 4 show the skirt of FIG. 1 in different conditions.
Figure 3:
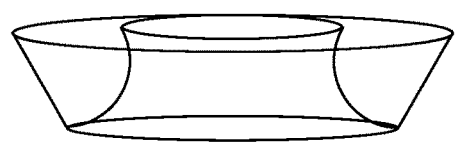
Figure 4:
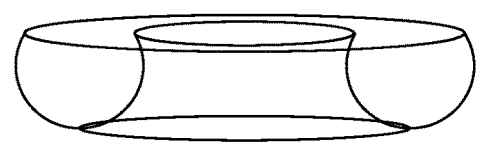

FIGS. 2, 3 and 4 show how the sidewalls can bulge depending on the mode of operation of the system. This causes a curved profile on the outer sidewall (FIG. 2), the inner sidewall (FIG. 3) or both sidewalls to form a toroidal geometry (FIG. 4).

Figure 5:
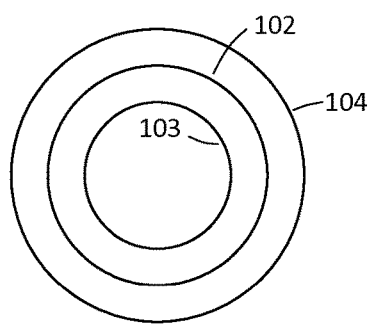
FIG. 5 is a schematic bottom view of the skirt shown in FIG. 1.
Figure 6:
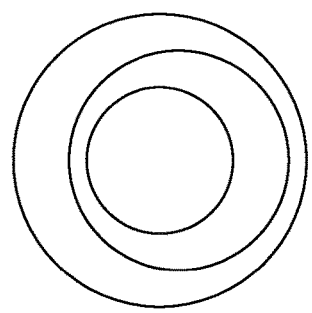
FIG. 6 is a schematic bottom view of an alternative skirt.

FIG. 5 shows the circular planform shape subtended by the skirt 100, 101. FIG. 6 shows an alternative embodiment in which the inner and outer sidewalls are obliquely conical. Thus, on the left hand side, as viewed, the sidewalls have a shallower slope than on the right hand side, to provide a swept hoverpad geometry. Such a hoverpad could be arranged on an airship or hybrid air vehicle with the bow of the vehicle on the left hand side. This improves the ride quality and reduces snagging on ground obstacles.

Figure 7:
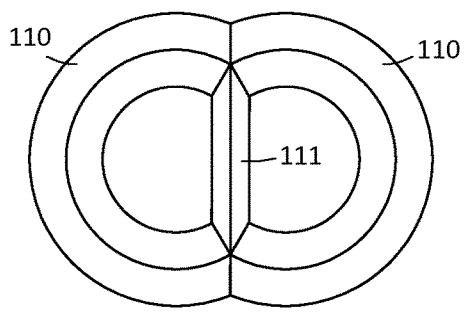
FIGS. 7 and 8 are schematic bottom views of two further embodiments of skirts having cross-dams.
Figure 8:
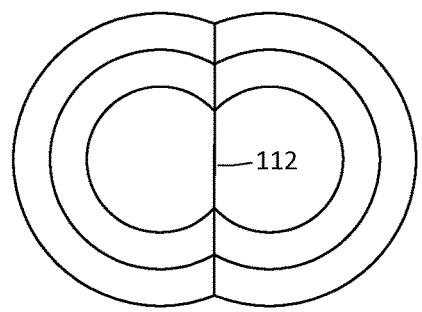

FIG. 7 shows an alternative hoverpad comprising a multicell arrangement of two peripheral circular segments 110 linked by a cross-dam 111, configured as a double walled V-section. FIG. 8 shows another multicell arrangement, in which a cross-dam 112 is a single walled diaphragm. In these arrangements, at the junction of the two peripheral skirt segments circumferential tension is reacted by the cross-dam.

Figure 9:
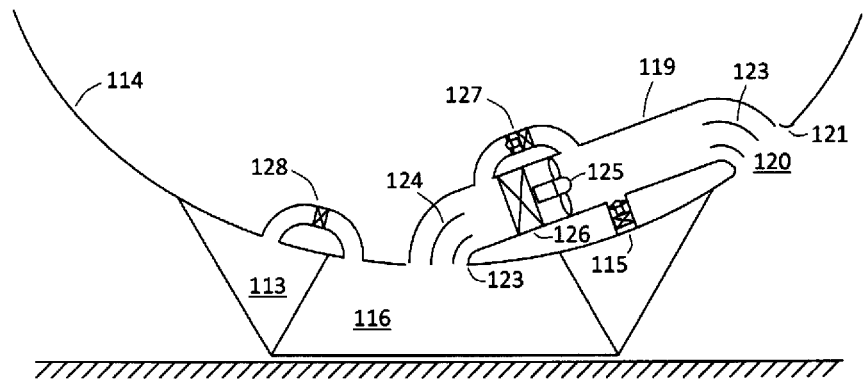
FIG. 9 is a schematic sectional view of an air cushioned landing system according to the invention.

FIG. 9 shows how the skirt 113 is attached in a conformal fashion to the air vehicle's hull 114. The annular volume contained between the inner and outer sidewalls of the skirt 113 is connected to one or more skirt inflation/deflation fans 115 installed in series with an isolation valve. In this example, the skirt inflation fans feed from the external atmosphere via a plenum air duct 119, but they may feed from the interior of the hull. Once the required skirt inflation pressure or volume fill has been achieved, the isolation valves enable airflow to be shut off. When the skirt is pressurised in this manner, the internal sidewalls 101 with a conical profile will bulge inwards towards the centre of the pad, pulling fabric inboard to form a toroidal shape and lowering the overall height of the skirt.

The volume enclosed by each hoverpad cell forms a plenum 116 when the peripheral skirt 113 is in close proximity or contact with the ground. The plenum air duct 119 is configured to link the plenum 116 to the external atmosphere, routed through the vehicle hull or adjacent structure. The plenum air duct incorporates one or more plenum feed fans 125 and a plenum isolation valve 126. Sharp bends in the plenum air duct are provided with turning vanes 124 to reduce aerodynamic losses. A single branched plenum air duct can feed a plurality of hoverpad cells, or each hoverpad can have at least one dedicated plenum air duct.

The plenum feed fans 125 are configured to provide positive pressure to allow the hybrid air vehicle to hover on a cushion of air. When the isolation valve 126 is closed, negative air pressure can be created inside the plenum 116 by a plenum suction fan and valve installation 127 acting in the opposite direction to the plenum feed fan 125, to suck the vehicle to the ground.

Part or all of the air output from the ACLS plenum feed fans 125 may also be diverted to the air vehicle's hull pressure management system.

The skirt inflation fans 115 can be operated independently of the plenum feed fans 125 to facilitate the adjustment of skirt fill when the plenum supply is switched off with the ACLS operating in park mode, or reversed with the ACLS operating in suck-down mode. This functionality will enable the height and attitude of the vehicle to be optimised for truck bed or rear ramp loading operations on uneven ground.

During hover borne operation, the skirt inflation pressure can be equalised with hoverpad plenum pressure by opening valves 128 housed in cross feed ducts linking the two volumes. This action removes tension from the inner sidewall 101, enabling the skirt to extend to its full operating height and establish a V-shaped profile.

The skirt cross feed ducts are closed when the skirt 113 is inflated for landing or when hoverpads are required to operate in parked or suck-down mode. The cross feed ducts may be opened just prior to landing to allow air to flow out of the skirt and back into the hoverpad plenum 116, serving to dissipate transient pressure spikes and rebound energy accumulated during the touchdown stroke.

From a functional standpoint, a number of the skirt cross feed ducts may be used to house the skirt inflation fans behind common isolation valves, or, as shown, these two components of the ACLS system may comprise independent installations. Similarly, the number of hull penetrations required to accommodate the ACLS system on the vehicle may be reduced by arranging, wherever practicable, plenum suction fans, skirt cross feed ducts and skirt inflation/deflation fans to feed and exhaust from ports in the walls of the plenum air ducts.

The plenum air ducts 119 feature radiused lips 121 at their outboard ends, to minimise aerodynamic losses when the air is drawn inboard to supply the hoverpads with positive pressure airflow. At the inboard end, the lip 123 can be either radiused or sharp-edged. Optionally, the duct 119 can be subdivided into a number of rigid segments linked together with flexible joints to accommodate hull flexure.

Figure 10:
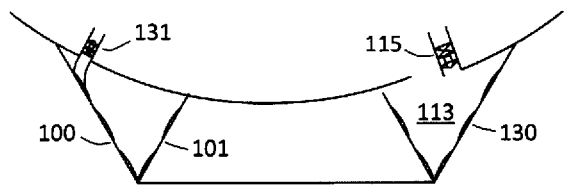
FIG. 10 schematically shows the air cushioned landing system in a deployed position.
Figure 11:
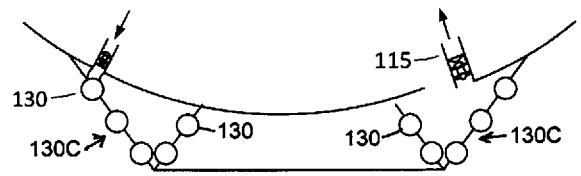
FIGS. 11, 12 and 13 show stages in the retraction of the air cushioned landing system of FIG. 10.
Figure 12:
Figure 13:
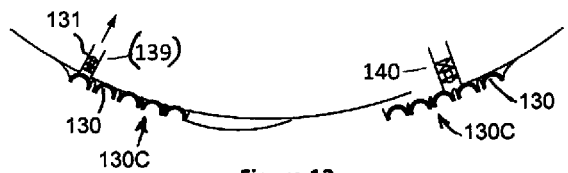

FIGS. 9 and 10 show the skirt 113 as deployed for landing and take-off. To aid with retraction of the ACLS hoverpad, the inner and outer sidewalls 100, 101 of the skirt incorporate a number of pockets 130 that can be inflated, by means of retraction tube fans 131, to form pressure stabilised retraction tubes as shown in FIG. 11. The associated take-up of sidewall fabric causes an initial reduction in the height of the skirt 113. On continued evacuation of the skirt volume, the inflated retraction tubes 130 function to stiffen selected areas of the skirt sidewalls 100, 101 during the retraction process, ensuring that the skirt collapses in a predictable and orderly fashion as it is progressively vacuumed up to the hull. Thus, the skirt is drawn upwards to conform neatly with the underside of the vehicle, presenting a low profile to external airflow, as shown in FIG. 12. Optionally, as shown in FIG. 13, the retraction tubes 130 may be evacuated by a retraction tube fan 131 operating in a reverse direction (139). Hoverpad skirts are maintained in the retracted configuration by closing skirt inflation fan valves 140.

The geometry of the pockets that form the retraction tubes 130 may take the form of a series of annular rings 130, as shown, vertically oriented lines, spiral arrays, or lattice networks combining two or more of these patterns 130C. The retraction tubes 130 may also be incorporated into hoverpad cross dams to ensure that they retract in concert with the peripheral skirt.

In this example, the retraction tube fans 131 are installed in series with isolation valves to maintain pressure after tube inflation or prevent the tubes 130 from partially re-inflating if they are required to be maintained in a vacuumed down state at the end of the retraction process. To prevent entrapment of air during the hoverpad retraction sequence, internal walls of the skirts and skirt retraction tubes may be selectively lined with perforated breather pipes or porous breather fabric.

The ACLS of the invention allows the vehicle to operate on rough or unprepared terrain including scrub, marsh, snow and water. The ACLS will also allow operation at prepared sites, with the skirt height and low ground footprint pressure ensuring that the vehicle is able to pass over obstacles such as signage, lights, kerbs, etc. without damage to the vehicle or obstacle.

The ACLS hoverpad retraction method is inherently fail-safe and avoids the moving parts of the known retraction mechanisms.

The skirt geometry of the invention is stable when partially inflated due to the action of hoop tension around its periphery and axial tension in hoverpad cross-dams. This characteristic enables the ground clearance and attitude of the vehicle to be adjusted when the ACLS is operating in park or suck-down modes.

Configuring the skirt walls with a conical geometry enables single-curvature patterning to be utilised, simplifying hoverpad design, manufacture and maintenance in comparison with conventional bag and finger skirt designs.

The subdivision of hoverpad plenums into multiple cells will ensure that the ACLS will continue to operate effectively when the vehicle adopts a nose up pitch attitude during take-off and landing.

During landing touchdown, the ACLS hoverpads can be configured to vent skirt and plenum air overboard through their plenum air ducts, which provides a damping action to arrest the vehicle's vertical rate of descent with minimal rebound.

Vehicle landing distances may be reduced by reducing the air supply fed to hoverpad plenums 116 to maintain the skirts in scrubbing contact with the ground.

The terms generally, essentially and substantially as used herein are considered to be substantially equivalent and may be used interchangeably.

An air cushioned landing system for an air vehicle, may comprise an inflatable and deflatable skirt 100, 101, 113 in the form of a tube having inner and outer walls 100, 101, the inner wall defining a central plenum 116 within the skirt, the skirt 113 including gas pockets arranged to stiffen one or more regions of at least one of the inner and outer walls 100, 101 during deflation of the skirt. A fan 115 is for sucking gas out of the skirt 113 to deflate the skirt, and for moving the gas pockets to a retracted location to reduce the profile of the skirt 113 in a controlled manner. Following deflation, the skirt 113 occupies a space immediately below an air vehicle hull 114, essentially equal in height to a diameter or height of the gas pockets. The gas pockets are constrained to move from a mutually spaced position, when the skirt 113 is inflated, to a mutually adjacent position when the skirt is deflated. The inner and outer walls 100, 101 each have a plurality of the gas pockets. The tube of the inflatable skirt 100, 101, 113 is endless and generally circular or elliptical. Each gas pocket may comprise a further endless tube, generally concentric with the skirt. The gas pockets may form a lattice or an array. A gas pocket fan 125, 131 is for inflating the gas pockets prior to deflation of the skirt 113. The gas pocket fan 125, 131, or a further gas pocket fan 125, 131, is arranged to deflate the gas pockets to reduce the profile of the deflated or inflated skirt 113. A valve 126, 127 is for placing the interior of the skirt 113 in communication with the plenum 116 and for isolating it therefrom. A flexible divider 111, 112 may form a connection between first and second peripherally spaced points on the inner wall 101. In an air vehicle having a gas-filled hull 114 of flexible sheet material, an air cushioned landing system according to the foregoing description may be attached to an underside of the hull 114. An air cushioned landing system according to the foregoing description may be provided in combination with an air vehicle having a gas-filled hull 114 of flexible sheet material, wherein the air cushioned landing system may be attached to an underside of the hull 114.

An air cushioned landing system for an air vehicle, may comprise an inflatable and deflatable skirt 100, 101, 113 in the form of a tube having inner and outer walls, the inner wall 101 defining a central plenum 116 within the skirt, and a valve 126, 127 for placing the interior of the skirt in communication with the plenum 116 and for isolating it therefrom. A control means is for opening the valve 126, 127 prior to a landing event and/or during hover borne operation. The valve 126, 127 may be located in a duct 119 extending through an air vehicle hull 114 from the skirt 113 to the plenum 116. A flexible divider 111, 112 may form a connection between first and second peripherally spaced points on the inner wall 101. In an air vehicle having a gas-filled hull 114 of flexible sheet material, an air cushioned landing system according to the foregoing description may be attached to an underside of the hull 114. An air cushioned landing system according to the foregoing description may be provided in combination with an air vehicle having a gas-filled hull 114 of flexible sheet material, wherein the air cushioned landing system may be attached to an underside of the hull 114.

An air cushioned landing system for an air vehicle, may comprise an inflatable and deflatable skirt 100, 101, 113 in the form of a tube having inner and outer walls, the inner wall 101 defining a central plenum 116 within the skirt 113, and a flexible divider 111, 112 forming a connection between peripherally spaced points on the inner wall 101. The divider 111, 112 may be formed as a cross-dam 111, 112 essentially equal in height to the skirt 113. The divider 111, 112 may comprise an inflatable and deflatable divider tube. The divider tube may have a V-shaped cross-section. The divider tube may includes gas pockets arranged to stiffen one or more regions of the divider tube during deflation thereof. The skirt 100, 101, 113 may comprise two or more part-circular lobes, which intersect where the divider meets the skirt. In an air vehicle having a gas-filled hull 114 of flexible sheet material, an air cushioned landing system according to the foregoing description may be attached to an underside of the hull 114. An air cushioned landing system according to the foregoing description may be provided in combination with an air vehicle having a gas-filled hull 114 of flexible sheet material, wherein the air cushioned landing system may be attached to an underside of the hull 114.

The invention claimed is:

1. An air cushioned landing system for an air vehicle, comprising an inflatable and deflatable skirt in the form of a tube having inner and outer sidewalls, the inner sidewall defining a central plenum within the skirt, the skirt including gas pockets arranged on at least one of the inner and outer sidewalls to stiffen one or more regions of the at least one of the inner and outer sidewalls during deflation of the skirt, and a gas pocket fan configured for rendering the gas pockets inflated prior to and during deflation of the skirt, wherein the inflated gas pockets are constrained to move from a mutually spaced apart position when the skirt is inflated, to a mutually closely adjacent position when the skirt is fully deflated, and wherein the inflating gas pockets are closer to each other in the mutually closely adjacent position than in the mutually spaced apart position.

2. The system according to claim 1, comprising a fan for sucking gas out of the skirt to deflate the skirt, and for moving the gas pockets to a retracted location to reduce the profile of the skirt in a controlled manner.

3. The system according to claim 2, wherein following deflation, the skirt occupies a space immediately below an air vehicle hull, the space being essentially equal in height to a diameter or height of the gas pockets.

4. The system according to claim 1, wherein the inner and outer sidewalls each have a plurality of said gas pockets.

5. The system according to claim 1, wherein the tube of the inflatable skirt is endless and substantially circular or elliptical around its perimeter or in cross-section or both around its perimeter and in cross-section.

6. The system according to claim 5, wherein each gas pocket comprises an endless tube, substantially concentric with the skirt.

7. The system according to claim 1, wherein the gas pockets form a lattice or an array.

8. The system according to claim 1 wherein said gas pocket fan, or a further gas pocket fan, is arranged to deflate the gas pockets to reduce the profile of the deflated or inflated skirt.

9. The system according to claim 1, including a valve for placing the interior of the skirt in communication with the plenum and for isolating the interior of the skirt from the plenum.

10. The system according to claim 9, wherein the valve is configured to be opened prior to a landing event, or is configured to be opened during hover borne operation, or is configured to be opened during hover borne operation and prior to a landing event.

11. The system according to claim 9, wherein the valve is located in a duct that extends from the interior of the skirt through an air vehicle hull to the plenum.

12. The system according to claim 1, including a flexible divider forming a connection between first and second peripherally spaced points on the inner sidewall.

13. The system according to claim 12, wherein the divider is formed as a cross-dam essentially equal in height to the skirt.

14. The system according to claim 12, wherein the divider comprises an inflatable and deflatable divider tube.

15. The system according to claim 14, wherein the divider tube has a V-shaped cross-section.

16. The system according to claim 14, wherein the divider tube includes gas pockets arranged to stiffen one or more regions of the divider tube during deflation thereof.

17. The system according to claim 12, wherein the skirt comprises two or more part-circular lobes, which intersect where the divider meets the skirt.

18. An air vehicle having a gas-filled hull of flexible sheet material, wherein the air cushioned landing system according to claim 1 is attached to an underside of the hull.

* * * * *